(12) United States Patent
Derr et al.

(10) Patent No.: US 7,099,147 B2
(45) Date of Patent: *Aug. 29, 2006

(54) CONTROL AND DISPLAY DEVICE

(75) Inventors: Andreas Derr, Wutöschingen (DE); Patrick Zahn, Eisenbach (DE)

(73) Assignee: Testo AG, Lenzkirch (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/701,211

(22) Filed: Nov. 4, 2003

(65) Prior Publication Data

US 2004/0095715 A1  May 20, 2004

Related U.S. Application Data

(63) Continuation of application No. 09/576,309, filed on May 22, 2000, now Pat. No. 6,665,174.

(30) Foreign Application Priority Data

May 20, 1999 (DE) .................. 199 23 015

(51) Int. Cl.
*G06F 1/20* (2006.01)
(52) U.S. Cl. ...................................................... 361/679
(58) Field of Classification Search .......... 361/679–681
See application file for complete search history.

(56) References Cited

U.S. PATENT DOCUMENTS 5,018,049 A * 5/1991 Mehnert ..................... 261/679
6,532,152 B1 * 3/2003 White et al. ................ 361/692

* cited by examiner

*Primary Examiner*—Yean-Hsi Chang
(74) *Attorney, Agent, or Firm*—Muirhead and Saturnelli, LLC

(57) ABSTRACT

A portable electrical control and display device is described, having an indicator panel, a keyboard with at least one key pad, and a single housing designed as a single piece and made of a temperature-resistant material, which seals the control and display device in a water-tight manner.

30 Claims, 4 Drawing Sheets

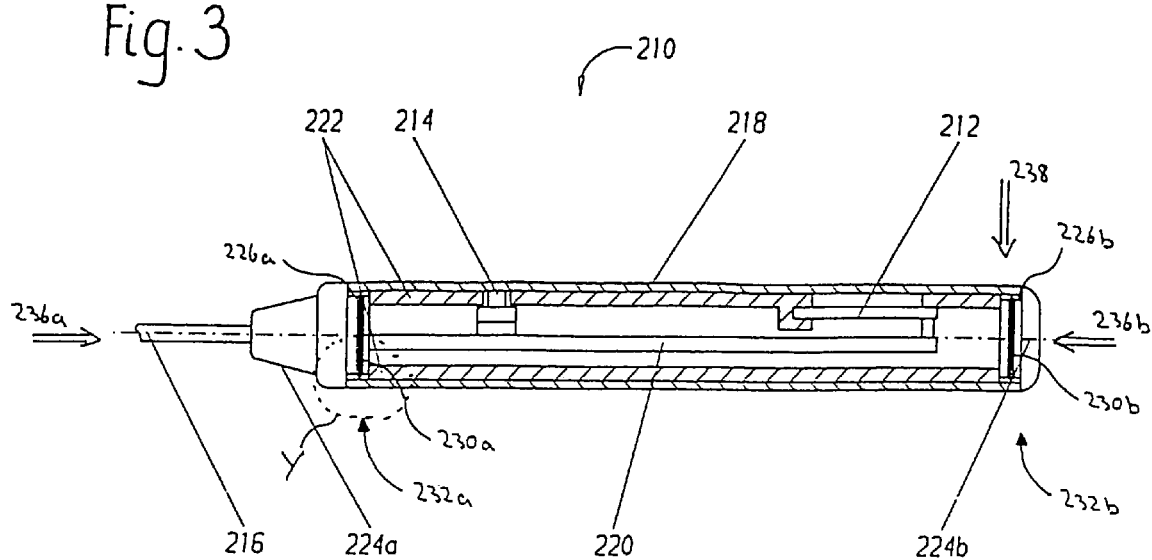
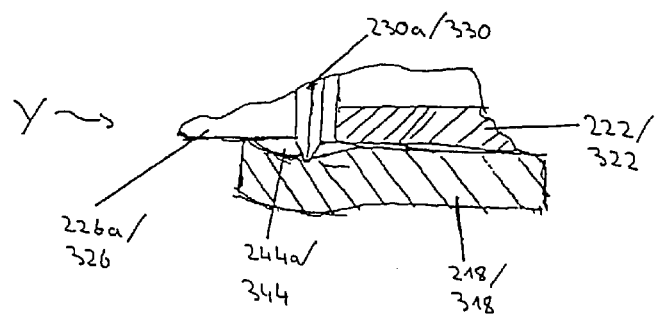
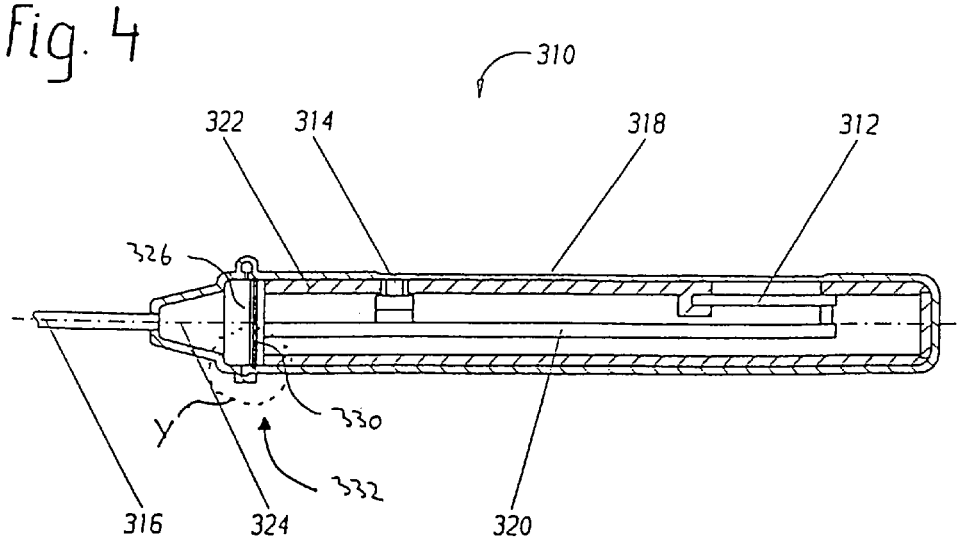

CONTROL AND DISPLAY DEVICE

CROSS-REFERENCE TO RELATED APPLICATIONS

This application is a continuation of U.S. patent application Ser. No. 09/576,309, filed May 22, 2000, now U.S. Pat. No. 6,665,174, which is incorporated herein by reference.

BACKGROUND OF THE INVENTION

1. Technical Field

This application relates to a control and display device and, in particular, to a protective covering for the device.

2. Description of Related Art

Devices, such as portable control and display devices, are generally known in a plurality of embodiments, for example, as measuring instruments. These instruments may be used in the food industry and in food processing plants such as, for example, slaughterhouses, refrigeration plants, restaurants, and the like. Instruments that may be used, for example, in the food industry and in areas related to food processing, may be required to comply with certain hygienic requirements and other regulatory requirements such as those set forth in national and international regulations. These requirements may relate to the cleanliness of the instruments, such as measuring instruments. The requirements may relate to, for example, prevention of contamination, such as, bacterial contamination, of the measuring instruments.

In order to avoid such contamination, the instruments may include protective devices. These protective devices are used for hermetically sealing the measuring instruments against water, dust, and similar contamination in a way so that the functionality and operability of the instrument are not affected by the protective device. One type of protective device includes flexible, mostly transparent, bag-type protective sheathings. These sheathings may, more or less, protect the instrument from water, dust, and the like. The functionality and operability of the instrument protected by the protective sheathing remain preserved thanks to the flexible sheathing. However, these flexible protective sheathings may be made of a relatively thin plastic material. The functionality of such protective sheathings may be reduced over time due to the rough operating conditions to which the measuring instruments may be exposed. Under extreme operating conditions, there is also the danger that the instrument may become damaged due to the effect of external forces, since the thin protective sheathing may be extremely sensitive to impact and forces. In other words, the protective sheathings may not be able to absorb such forces thereby possibly resulting in damage to the instrument.

Another disadvantage of these known protective sheathings is the fact that even the slightest damage to the protective sheathing surface may result in impairing the required water-tightness. This may subsequently irreversibly damage or destroy an electronic component that may be included in the instrument, and may be sensitive to moisture. Furthermore, once the instrument is in the protective sheathing, it cannot be attached to a bracket provided, and external components cannot be attached to the instrument.

German Patent Application 39 05 130 A1 describes an improved protective device for a measuring instrument. In contrast to the foregoing bag-type protective sheathing, German Patent Application 39 05 130 A1 describes a cover-like shield made of a non-deformable material used as a protective device. The shield covers the control and display elements arranged in the housing, thus protecting them. In order to attach the cover to the housing, fastening elements are provided. To ensure tightness, an integrated sealing lip is provided around the housing part of the measuring instrument. The shield that covers and seals the control and display elements is transparent at least in the areas of the above-named display and control elements.

As an alternative, it is also conceivable to design the protective device as a two-part protective housing (holster). An internal contour of the protective housing may be designed so that the measuring instrument can be placed inside with essentially no play, and the two protective housing parts held together by fastening elements.

Although the protective device designed as a non-deformable shield and the protective housing designed as a holster have a high degree of water-tightness when used with a control and display device, providing protection against the effect of outside forces, there may still remain problems and drawbacks.

Manufacturing costs may be substantially increased since the measuring instruments to be used in the aforementioned areas requires an additional protective housing. Even in this case, it is not possible to use a shield made of a very soft material, for example, a plastic, since such material does not have the rigidity required to obtain an effective seal or, alternatively may have this property only under certain conditions. Therefore, a two-component part having high rigidity may be used in order to obtain the required impact-absorbing soft surface. This may be, however, unacceptable due to the high cost involved.

Due to the sealing lip around and integrated in the housing part, a large surface is sealed. This may be very expensive especially when a tight seal is required. Therefore, often a plurality of support points, for example, screws or clamps, may be required and may result in an inability to obtain the required high degree of tightness. For example, screws must be perfectly tightened to obtain a tight seal in an effort to prevent gaps, and thus untightness, from occurring. In particular, when the screws are frequently removed from the measuring instruments, this gap-free seal becomes more and more difficult to guarantee.

Additionally, sealing forces and joining forces act in the same direction when the shield is mounted on the housing. Accordingly, higher sealing forces may be required to be applied for a good seal than in an alternative instance when the forces do not act in parallel. Undesirable tolerances and slack may be poorly compensated for, or not at all, when the shield is mounted on the measuring instruments due to the close geometric relationship between the shield and the measuring instrument.

Failure to use such a protective housing in the aforementioned cases for reasons of time or convenience or due to lack of tools for fastening the fastening means may occur, and the measuring instrument used may not be able to be cleaned in a convenient and, mainly, reliable manner in a cleaning machine.

An additional condition in handling the aforementioned measuring instruments is the high hygienic requirements. In the aforementioned fields of application of the instruments provided with such protective housings, different cleaning procedures are used. It has been found that cleaning procedures, for example, such as one using a wet but not previously used cleaning cloth, a disposable cloth, a cleaning agent (RIX), or a cleaning agent with subsequent alcohol disinfection, clean the instruments, more or less well. However, complete, one-hundred-percent cleaning cannot be assured with these cleaning procedures. Only when instruments are cleaned in a cleaning machine for 45 minutes at a temperature of 75 degrees Celcius is one hundred-percent cleaning effect achieved with both non-fatty and fatty contamination.

In order to reliably meet the required hygienic requirements, it is therefore desirable to subject the instruments to cleaning in a cleaning machine.

SUMMARY OF THE INVENTION

The invention provides a control and display device ensuring a relatively high degree of tightness, in particular, water-tightness. This is achieved according to the present invention by a control and display device which includes a single one-piece housing made of a temperature-resistant material, which seals the control and display device in a water-tight manner from the outside.

The present invention is based on the idea of integrating previously used multi-part additional protective housings into essentially one housing for a measuring instrument. This measuring instrument therefore includes a single, impact-resistant and water-tight housing, which may be a fixed component of this measuring instrument. Advantages of this measuring instrument, compared with known, two-part or multi-part, measuring instruments that require a water-tight housing (holster, shield) for use in wet environments, include low manufacturing costs.

An embodiment of the single-part housing is also very safe for the process concerning tightness since no screws are used that have to be perfectly tightened. Since the housing may be made of a temperature-resistant material and provide for a seal from the outside in a water-tight manner, it is suitable for cleaning with hot water of at least 75 degrees Celcius. Thus the housing may be cleaned in a cleaning machine in a simple manner, whereby the highest possible degree of disinfection is guaranteed.

The control and display device according to the present invention ensures not only the highest possible degree of water-tightness, but also very effective protection against impact and contamination is achieved at the same time.

Due to its elasticity and its shape, the housing fits the shape of the sleeve in an almost form-fitting manner. Thus no gap may occur between the housing and the sleeve, whereby the arrangement according to the present invention also provides for compliance with hygienic requirements.

In the case of a defective housing and/or a defective measuring instrument, the housing may be detached from the measuring instrument in a simple manner and, if necessary, replaced with a new housing. After checking and, if needed, repair, an instrument that gives the visual impression of being new may be provided by replacing the housing.

According to one embodiment of the present invention, the housing encloses a sleeve in which the circuit board, the indicator panel, the keyboard, or at least the contact-sensitive areas of the keyboard, are accommodated. This sleeve may be designed in the form of a box and may be closed on one or more sides by a cover. The sleeve has the function of supporting, as well as accommodating, the aforementioned elements of the measuring instrument. In another embodiment, the sleeve may be omitted, if, for example, the housing itself assumes the protective function. In this instance, the housing may have one or more support braces.

One advantage of the housing according to the present invention is that the housing may be mounted on the sleeve without tools while still achieving a high degree of tightness. This may be particularly advantageous if, for example, the measuring instrument used for on-site measurements cannot be cleaned. In this case, a plurality of clean, i.e., disinfected, housing sheathings may be used, for example, and substituted for the used housing sheathings.

Another advantage that may be achieved using the present invention is that the directions of the joining force and the sealing force may be perpendicular to one another. In order to achieve a high degree of tightness, relatively small sealing forces are sufficient for sealing. Since sealing occurs perpendicularly to the direction of joining with almost no force, no fastening elements such as screws or clamps are required here, which may reduce development and manufacturing time, sealing surfaces and therefore fastening material and sealing material costs.

The sealing device between sleeve and housing may be implemented using, for example, a peripheral groove or a peripheral ridge, applied to the sleeve or the housing so that the ridge engages in the groove when the sleeve and the housing are joined together. In this instance, a particularly good sealing effect may be achieved between the two parts by the use of an elastic material in conjunction with an at least slightly larger groove compared to the ridge. The sealing effect of the sealing device between the sleeve and the housing may be further enhanced by applying sealing lips on the groove and/or the ridge.

In another embodiment of the sealing device, a plug or a ring, advantageously reinforced by braces, is provided, which is pushed into the housing that is open on one side. This ring or plug may be attached to a cover, to the sleeve, or to the housing. This ring or plug may be have pointed pins, nubs, peripheral ribs, or wedges, which engage in the softer material of the jacket on the opposite side or press on the harder material by deformation to achieve a good sealing effect. In these cases, cylindrical rings or plugs, which taper slightly in the direction of insertion, may be used to achieve a sealing effect. The sealing device may also include a snap-in detection device to ensure reliable engagement of the ridge in the groove, or of the plug, or ring, in the housing, or the sleeve.

A more or less soft plastic, such as an elastomer, may be used as the housing material in accordance with the application and the need. This plastic material may have the required impact-absorbing rigidity required for sealing and protection, as well as the soft surface for the functionality of the keys to be pressed. The housing may be made, at least in part, of a TPU, TPE, or PVC material. An injection molded part that may be easily and inexpensively manufactured, may be used as the housing.

In using such materials, for example, soft PVC or thermoplastic TPU, a fully transparent housing may be used in an embodiment. However, an alternative embodiment may include a housing of a semi-transparent material. The use of transparent or semi-transparent materials may result in ease of reading characters, for example, those included on the indicator panel, the keyboard, and/or additionally, markings on the sleeve. In an embodiment, the housing may also be manufactured of a non-transparent, colored material. In this case, a transparent protective sight glass may be provided in the area of the indicator panel.

The housing may be an elongated plastic hose having the same diameter as, or a slightly larger diameter than, the sleeve of the measuring instrument. In this case, assembly may be performed as by pulling the hose over the measuring instrument and providing it with suitable sealing devices at its open ends. The adhesive forces may be provided by the adhesion of the hose having a larger size to the sleeve. When a hose is used, advantageously little or no tool costs may be involved.

According to another embodiment of the present invention, the housing includes a number of push rods corresponding to the number of keys in the keyboard area. The push rods raise outward over the surface of the housing. The control area or the keyboard of the measuring instrument may also be formed by a housing section having a reduced wall thickness. In this case, the control area may be manufactured in one piece with the housing from the same material.

In another embodiment, recesses may be provided, on the side facing away from the control area or the keyboard. These recesses may be used for attaching the device to a corresponding bracket. To achieve increased rigidity in use and improved handling of the housing, in another embodiment of the device at least one reinforcing strip is provided, which is made of the same material as the housing. The reinforcing strip furthermore may provide increased protection of the circuit board located inside the sleeve against forces acting from the outside.

The sealing effect in the area of an opening may be ensured by matching the shape and size of the opening to the shape and size of the plug, so that the housing is in contact with the plug over the entire surface of the latter and thus in a water-tight manner. In another embodiment, a sealing lip is provided in the opening, which is in a linear peripheral contact with the plug passing through it, thus providing a water-tight seal. This variant has the advantage that the plug may be inserted in the opening using little force. The opening may be closed with an appropriate cap when no plug is used.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 depicts an example of a cross-section of a third embodiment of a measuring instrument according to the present invention;

FIG. 4 depicts an example of a cross section of a fourth embodiment of a measuring instrument according to the present invention;

DETAILED DESCRIPTION OF VARIOUS EMBODIMENTS

Unless otherwise stated, identical elements or elements having the same functions in the subsequent figures are provided with the same reference symbols.

The different embodiments are described below with reference to measuring instruments 10, 110, 210, and 310. Embodiments, however, are not limited to such measuring instruments. The features described herein may be used for control and/or display devices of any kind.

Figure 1:
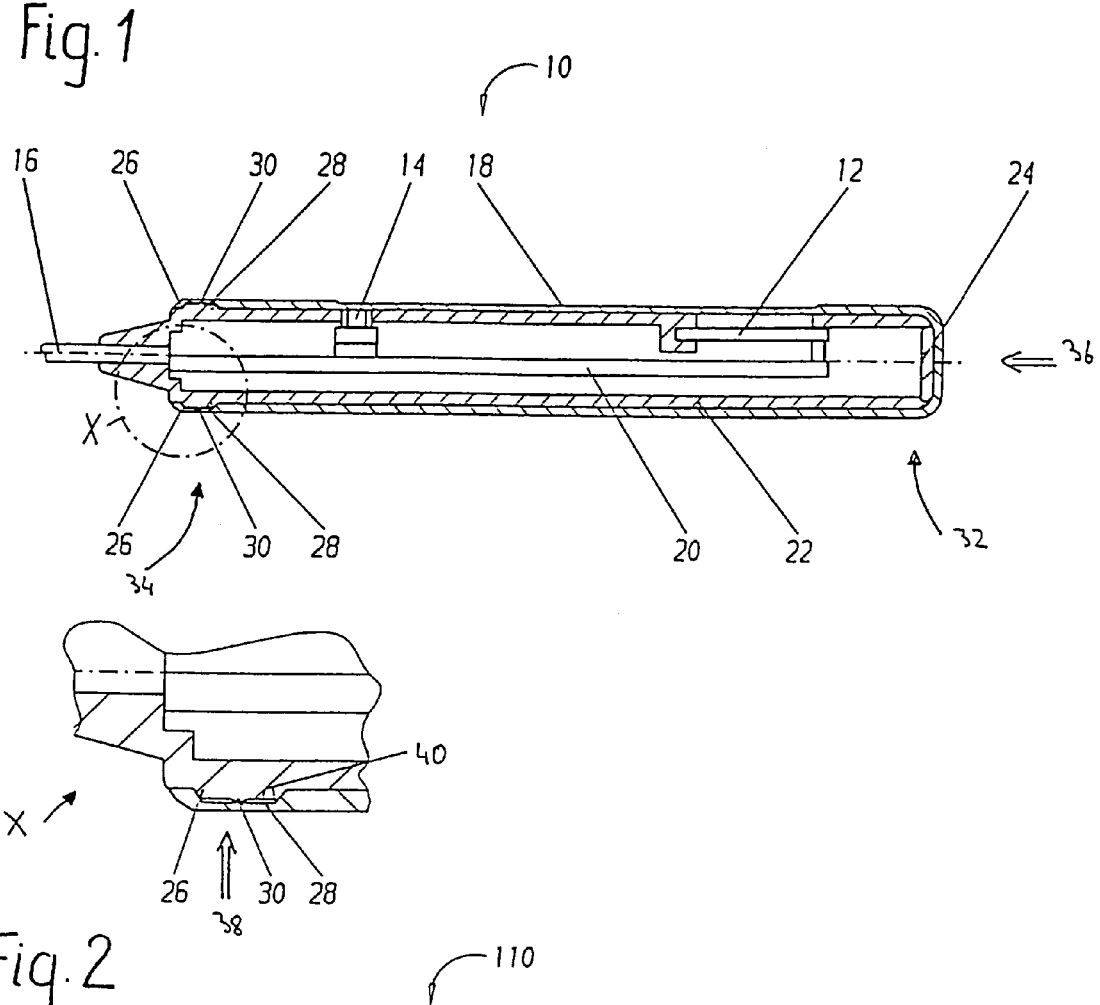
FIG. 1 depicts an example of a cross-section of a first embodiment of a measuring instrument according to the present invention with a detail, X, showing the seal.

Referring to FIG. 1, shown is an example of a first embodiment of a cross-section of a measuring instrument 10. Instrument 10 has, in the embodiment illustrated, a single housing 18, which has an essentially U-shaped cross section and accommodates an also essentially U-shaped sleeve 22 so that the end of sleeve 22, open on one side, is located on base 32 of housing 18. The end of sleeve 22, open on one side, is closed by a cover 24. A measuring sensor 16 protrudes from sleeve 22 on the side of sleeve 22 facing away from cover 24 and base 32. In the present embodiment, sensor 16 is designed as a probe tube for temperature measurement, but sensor 16 may also be designed in any other manner, for example, as a hygrometer probe, ampere meter, ohmmeter, pressure gauge probe, and the like.

A circuit board 20 having an indicator panel 12 and coupled to a keyboard 14 via contact-sensitive areas on circuit board 20, is provided within sleeve 22.

Indicator panel 12 may be designed as a display, for example, which is activated via electric control signals provided, for example, by an integrated circuit arranged on the circuit board in conjunction with an analog-digital converter. Keyboard 14 typically has individual keys, but may also have a single key. The keys of keyboard 14 may be designed in a nub shape. In one embodiment, an electrical signal is generated via contact-sensitive contact points on circuit board 20 when a key is contacted by a contact point; this signal is sent to an integrated circuit arranged on circuit board 20, for example, a processor or a logic circuit. Depending on the signals thus generated, the integrated circuit accordingly generates the control signals for activating indicator panel 12.

In the present embodiment according to FIG. 1, housing 18 is made of a fully transparent or at least semi-transparent material. Semi-transparent materials may be defined as materials that, while (slightly) colored, are still transparent from the outside, so that characters may be recognized within housing 18. As used herein, reference to a transparent housing 18 or a transparent sleeve 22 refers to a semi-transparent housing 18 or sleeve 22.

Since housing 18 of FIG. 1 is fully transparent, it allows visual access to indicator field 12 and to keyboard 14. Symbols, letters or numbers in indicator panel 12, keys of keyboard 14, and markings printed on the sleeve representing manufacturer's markings, for example, may be visible from outside housing 18.

Housing 18 and/or sleeve 22 may be made of a plastic containing, at least in part, TPU, TPE, PVC, or similar materials. Housing 18 may be injection molded. Housing 18 and sleeve 22 be made of a temperature-resistant material, i.e., for temperatures higher than 70 degrees Celcius, and thus may be suitable for cleaning in a cleaning machine.

As depicted in FIG. 1, housing 18 surrounds sleeve 22 in an essentially form-fitting manner and leaving only a base area 34 of sleeve 22 free. This essentially form-fitting connection between housing 18 and sleeve 22 may be achieved either by pushing housing 18 into sleeve 22 in the horizontal direction 36 or vice-versa. This essentially form-fitting and therefore very rigid jacket provides a good seal, which, additionally may provide for adherence to hygienic requirements by providing a high degree of water-tightness of measuring instrument 10.

Accordingly, measuring instrument 10 of FIG. 1 includes a sealing device 26, 28, 30, arranged near an end, open on one side, of U-shaped housing 18 or the respective areas of sleeve 22 in the proximity of base 34. Sealing device 26, 28, 30 has a peripheral ridge 26 near base 34 of sleeve 22. This ridge 26 engages in a corresponding groove 28, formed near the open end of U-shaped housing 18.

In order to enhance the sealing effect, peripheral ridge 26 may also include a peripheral sealing lip 30 in close contact with groove 28 of housing 18. Sealing lip 30 may be formed as a pointed tip or a nub, so as to engage in the respective areas of groove 28 to obtain a good sealing effect. Additionally, depending on the width of ridge 26 and groove 28, sealing device 26, 28, 30 may include a plurality of such pointed tip or nub-like sealing lips 30 to further enhance the sealing action of sealing device 26, 28, 30. As an alternative, sealing lip 30 may also be designed as one or more wedge-shaped or rib-shaped annular seals around ridge 26.

Sealing lip 30 may be made of the same material as or of a harder material than opposite groove 28, in which it engages. Alternatively, sealing lip 30 may be made of a softer material than groove 28 and produce the desired sealing effect by pressure contact, i.e., by deformation. Additionally, the arrangement of groove 28 and ridge 26 on housing 18 and sleeve 22 may alternatively be switched around. One embodiment of ridge 26 and/or sealing lip 30 may include a nub-in device 40 to ensure that ridge 26 is in regular contact with the area of groove 28.

Due to the arrangement of sealing device 26, 28, 30, the direction 38 in FIG. 1 of the sealing forces is perpendicular, i.e., at an angle of approximately 90 degrees, to direction 36 of the joining forces. Due to the perpendicularity of the sealing and joining forces, a sealing surface that is smaller when compared with the force in the case of parallelism between the sealing and joining forces, is needed.

Figure 2:
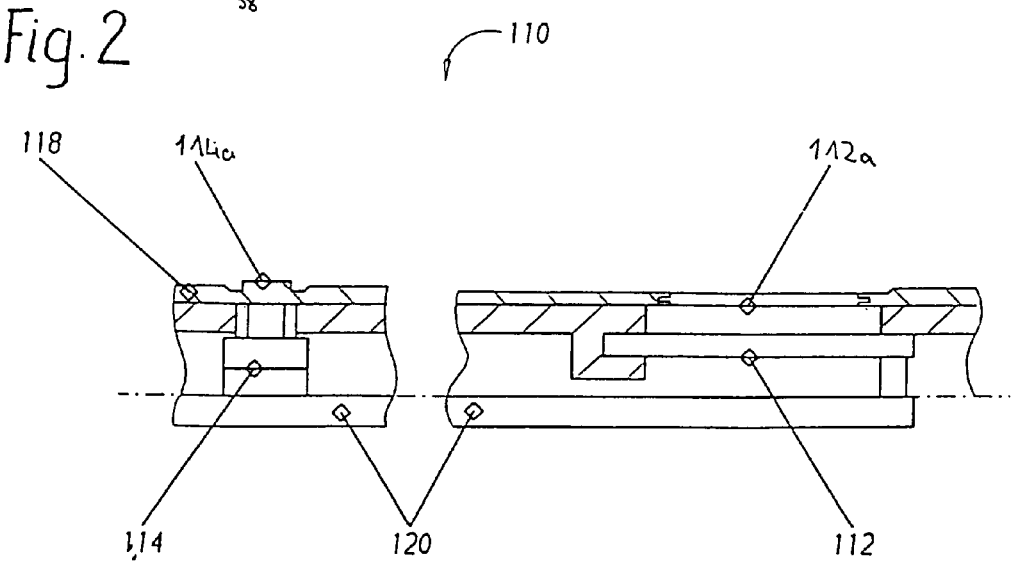
FIG. 2 depicts details of an example of the indicator area and the keyboard area of a second embodiment of a measuring instrument according to the present invention.

FIG. 2 is an example of a cross section of details of an embodiment of an indicator area and a keyboard area of a second embodiment of a measuring instrument. The same reference symbols, increased by 100, are used for the same elements and parts or those having the same function as in FIG. 1.

Instrument 110, shown in partial cross section in FIG. 2, also includes a housing 118, having an indicator panel 112, a keyboard 114, a circuit board 120, and a sleeve 122. Housing 118 has, in the area of the control panel, push rods 114a, each of which is assigned to a key of keyboard 114. These push rods 114a raise over the outer area of housing 118. In order to ensure simple actuation of keyboard 114, housing 118 in this embodiment may have, in the area of keyboard 114, i.e., at the edge of push rods 114a, a reduced wall thickness, so that this area of housing 118 can be easily elastically deformed, for example, with a finger tip or a rod for actuating the keys.

In contrast to the first embodiment according to FIG. 1, housing 118 is transparent only in the area of keyboard 114 and/or indicator panel 112. The remaining areas of housing 118 may be made here of a colored, non-transparent material. Housing 118 may include, in the area of indicator field 112, a transparent protective sight glass 112a, which is firmly attached to housing 118.

The remaining components of the embodiment according to FIG. 2 are identical to those of the embodiment according to FIG. 1, so that these components shall not be further described in order to avoid repetition.

FIG. 3 is an example of a third embodiment of measuring instrument 210. Identical element and parts or those having identical functions, are identified by reference numbers increased by 200 compared to those of FIG. 1.

With respect to the previously described embodiments set forth herein, a difference with reference to the embodiment of FIG. 3 is that housing 218 is provided with open end faces 232a, 232b arranged opposite each other. Each of these end faces 232a, 232b may be closed by a cover, respectively, 224a, 224b. A sensor 216 may be arranged on one of these covers, such as 224a, for example. Furthermore, this measuring instrument 210 may also include the above-described components, namely an indicator panel 212, a keyboard 214, a circuit board 220, and a sleeve 222.

In FIG. 3, end areas 232a, 232b of housing 218 are sealed via sealing devices. The sealing devices, which here seal housing 218 at the two covers 224a, 224b, may include a fixed ring 226a, 226b, which are also attached to a cover 224a, 224b. These fixed rings 226a, 226b may be designed so that they engage in the soft jacket of housing 218 when a ring 226a, 226b is pushed into housing 218, achieving a good sealing effect.

Rings 226a, 226b may be designed in a cylindrical shape to slightly tapers in the direction of insertion. If this ring 226a 226b is pushed into housing 218 via cover 224a, 224b, a very good sealing effect may be achieved with a slight pressure in the direction 236a, 236b.

In one embodiment, at least one ring 226a, 226b may include a support device 230 (not illustrated), such as, for example, support braces or support pins. This support device may ensure the stability of ring 226a, 226b such that ring 226a, 226b is actually pressed into the softer jacket of housing 218 and is not pressed in itself by the jacket. Similarly, with reference to the embodiment of FIG. 1, at least one ring 226a, 226b may also have at least one peripheral sealing lip or sealing spring 230a, 230b, designed, for example, as a pointed tip to engage in housing 218 in direction 238 when a ring 226a, 226b is inserted in the directions 236a, 236b (see detail Y). A depression 244a may also be included in an embodiment of housing 218 into which sealing lip 230a, 230b can engage. In this manner, the sealing lip 230a, 230b may engage in the housing. An embodiment may also include peripheral rib-, nub-, or wedge-shaped areas in the outer peripheral surface of a ring 226a, 226b with these areas engaging in the jacket of housing 218 similarly to the above-described pointed tip-shaped sealing lips or springs 230a, 230b when ring 226a, 226b is inserted into the jacket of housing 218.

In the embodiment of FIG. 3, a hose, for example, a PVC hose, may be used as the housing 218.

Referring to FIG. 4, shown is an example of a fourth embodiment of a measuring instrument 310. The reference numbers correspond to those of FIG. 1, however, increased by 300.

In contrast to FIG. 1, a housing 318 shown in FIG. 4 may be of a U-shaped design, but being closed on open side 332 by a cover 324. This cover 324 may be pivotably attached to one free end of housing 318. Although it may be made of a material other than the material of housing 318, an embodiment may have both cover 324 and housing 318 made of the same material for possibly making easier the manufacturing process of the same.

It should be noted that the measuring instrument 310 has the above-described components, namely an indicator panel 312, a keyboard 314, a circuit board 320, and a sleeve 322.

FIG. 4 also depicts a sealing device on side 332, open on one side, of housing 310. The sealing device, which is shown as a component of sleeve 322, may include a plug 326 connected to sleeve 322 near the end face of sleeve 322. Similar to FIG. 3, plug 326 may include one or more pointed tip or wedge-shaped peripheral sealing springs or sealing lips 330 to engage in housing 318 to achieve a very high degree of sealing effect (see detail Y) when housing 318 is pulled over sleeve 322. Also here, a depression 344, in which sealing lip 330 may engage, may b included in housing 318. Alternatively, plug 326 with peripheral sealing springs or sealing lips 330 may not be connected to sleeve 322, but may rather be inserted from the outside into housing 318.

In the foregoing embodiments, an internal supporting frame may be provided as sleeve 22, 122, 222, 322 to accommodate the functional elements such as, for example, the circuit board, the indicator panel, the keyboard, and the current/voltage supply (not illustrated). The sleeve may not to be considered as a housing. Rather, the housing function, as described in detail above, may be performed exclusively by the housing denoted by reference numbers 18, 118, 218, 318. In the foregoing embodiments, the sleeve does not have to be water-tight. The sleeve may be used to lend stability to the measuring instrument and, accordingly, must have a sufficiently sturdy design. The sleeve may also form a stable unit, i.e., it is fastened by gluing, clamping, screwing, etc., thus forming a functional, albeit not water-tight, unit even without the housing. For stability reasons, it is also advantageous if the housing has reinforcing strips (also not illustrated), which are made of the same material as the housing. In this case, the sleeve may be omitted altogether.

The measuring instrument as described herein may have a current/voltage supply not illustrated in the figures. In portable instruments, this current/voltage supply may be designed, for example, as a regular battery or an accumulator.

The foregoing embodiments of measuring instruments may include an indicator panel designed as a display, and a control device designed as a keyboard. An embodiment of the measuring instrument may also only include an indicator panel, but no keyboard or vice-versa. As an alternative, an acoustic indicator, transmitting a buzzer tone, for example, as a measuring signal, may be provided instead of the visual indicator panel.

Although not illustrated in the Figures, the measuring instrument may have recesses, preferably on the side facing away from the control area, i.e., the keyboard, for attachment to a suitable bracket. Furthermore, an opening may be included in the housing, through which a plug may be inserted in a water-tight manner. In this case, the shape and size of the opening may be matched to the shape and size of the plug so that the plug is in a water-tight contact with the housing in the area of the opening. This opening may be closed with a cover if a plug is not used. In addition to the sealing devices described in FIGS. 1, 3, and 4, two more embodiments of sealing devices for sealing a housing are described below with reference to FIGS. 5 and 6. Identical elements or elements with identical functions are denoted in FIGS. 5 and 6 with the same reference numbers used in FIG. 1.

Figure 5:
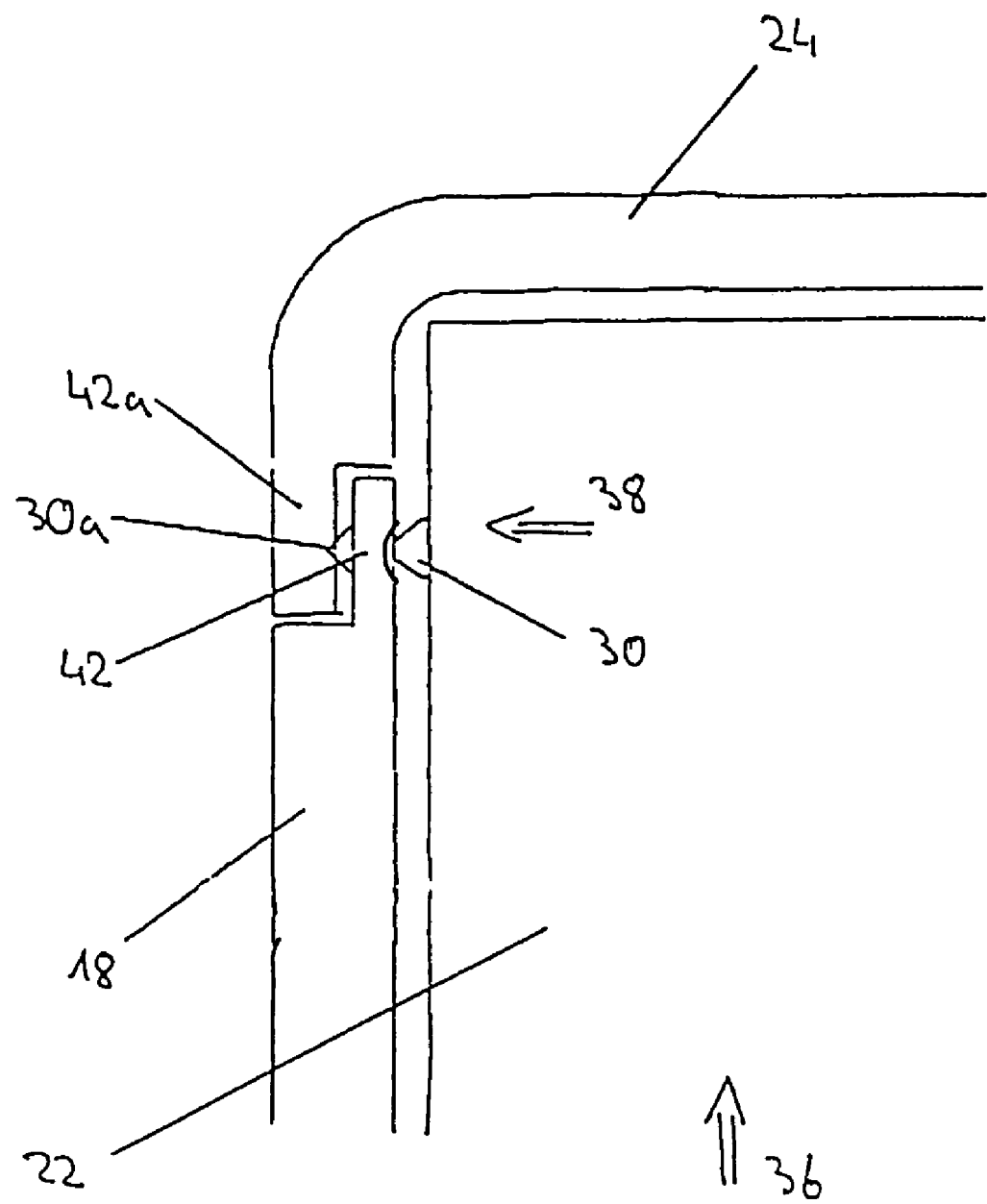
FIG. 5 depicts detail of an example of an embodiment of a sealing device for housings having an elastic design.

Referring to FIG. 5, shown is an example of an embodiment of a sealing device for a housing 18. As will be described, this embodiment includes an elastic design. Housing 18 may be covered at its open side by a cover 24. The cover 24 may be pushed, at least in part, over the housing. Housing 18 and cover 24, which may be pushed into one another, completely surround sleeve 22. For housing 18 and cover 24 to be pushed into one another, they may include stepped areas 42, 42a at their open ends, which match one another as accurately as possible. Thus, for example, if housing 18 is pushed over sleeve 22, sealing lip 30 engages in the jacket of housing 18 near the open end of housing 18. In order to provide a tight connection between housing 18 and cover 24, another peripheral sealing lip 30a may be provided, which is arranged in stepped area 42 of housing 18 in this embodiment according to FIG. 5. Accordingly, if cover 24 is pushed over housing 18, sealing lip 30a may be flattened by the harder cover 24. A seal may obtained using the foregoing arrangement in a very simple, however, effective manner in housing 18, which is open at one end.

Sealing lips 30, 30a may be designed here, like in FIG. 1, in the shape of pointed tips, nubs, wedges, or ribs. Sealing lip 30 may be used, in addition to sealing, for securing housing 18 with respect to sleeve 22. If such securing is not necessary in an embodiment, sealing lip 30 may be omitted, so that the housing may be sealed toward the outside by sealing lip 30a alone. Furthermore, cover 24 may also be omitted from an embodiment if the respective area of the measuring instrument does not have to be protected or is not water-sensitive. In this case, however, peripheral sealing lip 30 must be used for sealing the remaining part of the measuring instrument.

Figure 6:
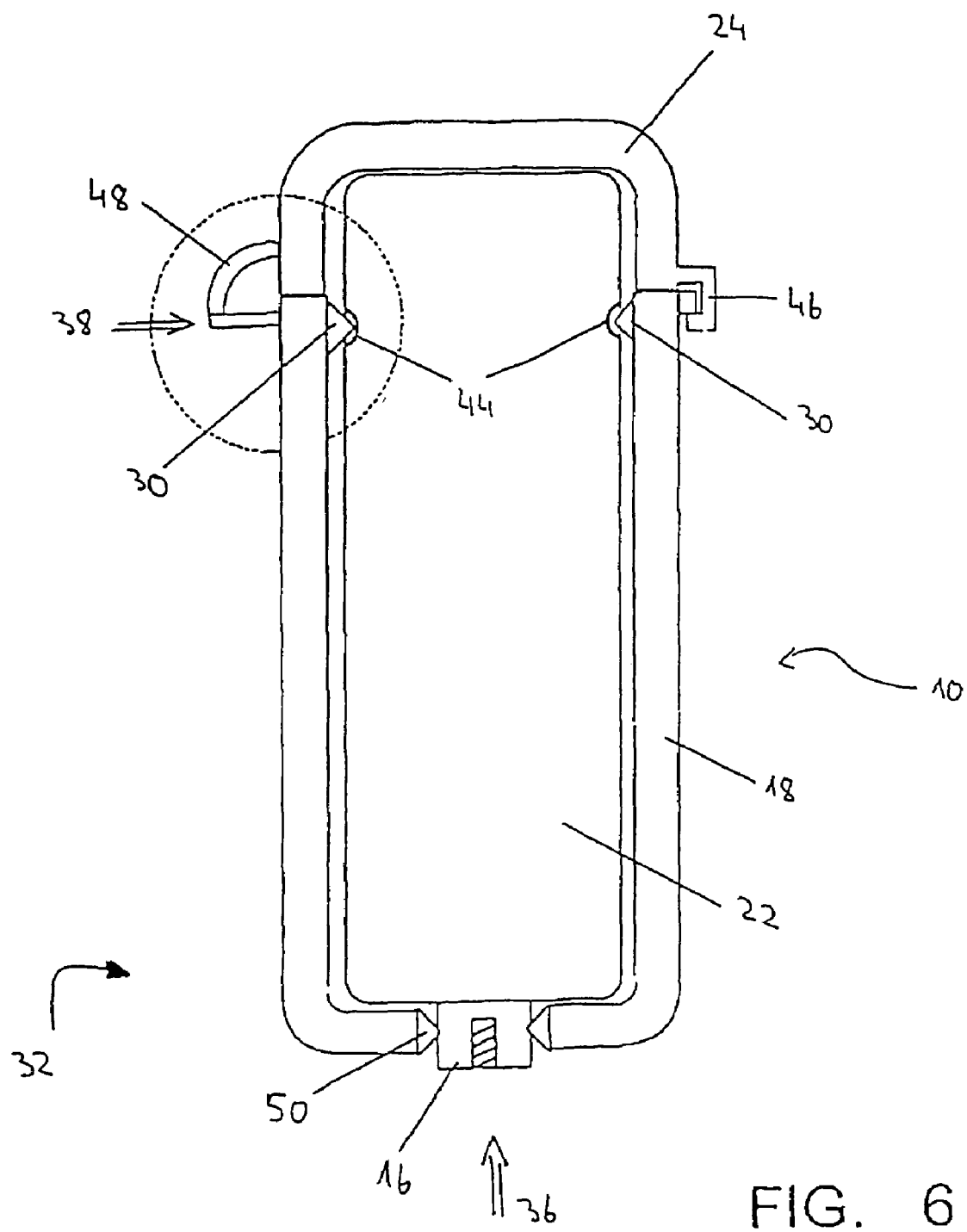
FIG. 6 depicts another embodiment of a sealing device for a housing.

Referring to FIG. 6, shown is another example of an embodiment of a sealing for a housing. FIG. 6 depicts a housing 18 and a cover 18 that closes housing 18. In contrast to FIG. 5, however, sealing lip 30 of FIG. 6 is applied to housing 18 itself to seal housing 18 with respect to sleeve 22. In addition, a depression 44 may be provided in sleeve 22 in the area where sealing lip 30 is to engage in it.

In contrast to the embodiment of FIG. 5, in FIG. 6 the open ends of housing 18 and cover 24 are not stepped. Cover 24 may be attached to housing 18 via a hinge device 46. A locking device 48 may also be included to ensure the closing of housing 18 and cover 24.

At base 32 of housing 18, a measuring sensor 16, connected to sleeve 22, protrudes from an opening in housing 18 in a manner similar to the embodiment of FIG. 1. In the area of the opening, housing 18 may include additional sealing lips 50, which may be flattened by the material of sensor 16 to provide a water-tight connection between housing 18 and sensor 16.

The foregoing control and display device designed as described above achieves a sealing action with the same sealing surface without the disadvantages of the control and display devices of the related art using a simpler means compared to the prior art.

While the invention has been disclosed in connection with various embodiments, modifications thereon will be readily apparent to those skilled in the art. Accordingly, the spirit and scope of the invention is set forth in the following claims.

What is claimed is:

1. A portable electrical control and display device, comprising:
   an indicator element;
   a control element;
   a housing that contains said indicator element and said control element, said housing including a transparent protective sight glass and having a soft jacket; and
   at least one sealing device that closes said housing in a water-tight manner, said at least one sealing device including a support device which can be pushed into the soft jacket of the housing on at least one side, said support device engaging in the housing when pushed in.

2. The control and display device of claim 1, wherein said indicator element is a visual indicator panel.

3. The control and display device of claim 1, wherein said indicator element is an acoustic indicator.

4. The control and display device of claim 1, wherein said control element is a keyboard with at least one keypad.

5. The control and display device of claim 1, wherein said support device is cylindrical in shape, tapering in the direction of insertion.

6. The control and display device of claim 1, wherein the housing is at least partially made of a colored material and wherein said transparent protective sight glass is connected to the housing in an area of the indicator element.

7. The control and display device of claim 1, wherein said housing is made of a temperature-resistance material that is resistant to a temperature of at least 70 degrees Celsius.

8. The control and display device of claim 1, wherein said housing includes a sealing lip that engages said at least one sealing device when said sealing devices is pushed into said housing.

9. The control and display device of claim 1, further comprising a sleeve that accommodates said indicator element and said control element and supports said housing.

10. The control and display device of claim 9, wherein the housing and the sleeve are similar in shape and the housing encloses the sleeve in an essentially form-fitting manner.

11. The control and display device of claim 1, wherein said housing is in two parts that are attached together.

12. The control and display device of claim 11, wherein said two parts of the housing are attached together in a water-tight manner.

13. The control and display device of claim 11, wherein said sight glass is disposed in one of the parts.

14. A portable electrical control and display device, comprising:
    an indicator element;
    a control element;
    a housing that contains said indicator element and said control element, said housing including a transparent protective sight glass and having an open end; and
    a sleeve that accommodates said indicator element and said control element; and
    at least one sealing device that closes said open end of said housing in a water-tight manner, said at least one sealing device including a peripheral groove and a matching peripheral ridge arranged at opposite locations on the housing and the sleeve, wherein when the housing and sleeve are joined together, the ridge engages the groove to close said open end of said housing in said water-tight manner.

15. The control and display device of claim 14, further including at least one sealing lip applied to one of the groove and the ridge, the at least one sealing lip being engaged when the housing and the sleeve are joined together.

16. The control and display device of claim 14, wherein said indicator element is a visual indicator panel.

17. The control and display device of claim 14, wherein said indicator element is an acoustic indicator.

18. The control and display device of claim 14, wherein said control element is a keyboard with at least one keypad.

19. The control and display device of claim 14, wherein the housing is at least partially made of a colored material and wherein said transparent protective sight glass is connected to the housing in an area of the indicator element.

20. The control and display device of claim 14, wherein said housing is made of a temperature-resistance material that is resistant to a temperature of at least 70 degrees Celsius.

21. The control and display device of claim 14, wherein the housing and the sleeve are similar in shape and the housing encloses the sleeve in an essentially form-fitting manner.

22. The control and display device of claim 14, wherein said housing is in two parts that are attached together.

23. The control and display device of claim 22, wherein said two parts of the housing are attached together in a water-tight manner.

24. The control and display device of claim 22, wherein said sight glass is disposed in one of the parts.

25. A portable electrical control and display device, comprising:
    an indicator element;
    a control element;
    a housing that contains said indicator element and said control element, said housing including an open end and a transparent protective sight glass and a control area portion, wherein said control area portion of the housing is disposed in a corresponding position to said control element and includes at least one component that contacts said control element when said control element is engaged; and
    a sleeve that accommodates said indicator element and said control element, said sleeve including a peripheral ridge, wherein, when the housing and sleeve are joined together, the peripheral ridge engages a matching peripheral groove in the housing to close said open end in a water-tight manner.

26. The control and display device of claim 25, wherein said housing is made of a softer material than said sleeve.

27. The control and display device of claim 26, wherein said ridge forms said groove in said housing when said housing and said sleeve are joined together.

28. The control and display device of claim 25, wherein said housing is in two parts that are attached together.

29. The control and display device of claim 28, wherein said two parts of the housing are attached together in a water-tight manner.

30. The control and display device of claim 28, wherein said sight glass is disposed in one of the parts.

* * * * *